United States Patent [19]
Shakespear

[11] 3,799,607
[45] Mar. 26, 1974

[54] VEHICLE BODY CONSTRUCTION

[75] Inventor: Horacio Shakespear, West Bloomfield, Mich.

[73] Assignee: General Motors Corporation, Detroit, Mich.

[22] Filed: Nov. 24, 1972

[21] Appl. No.: 309,195

[52] U.S. Cl. ................................. 296/155, 49/413
[51] Int. Cl. ............................................ B60j 1/16
[58] Field of Search ........... 296/146, 147, 148, 155; 49/413, 404, 164, 48

[56] References Cited
UNITED STATES PATENTS
1,646,794  10/1927  Racz ................................. 296/147
3,605,341  9/1971  Puckett ............................... 49/413

Primary Examiner—David Schonberg
Assistant Examiner—John A. Pekar
Attorney, Agent, or Firm—Saul Schwartz

[57] ABSTRACT

A vehicle body construction and particularly a vehicle door construction incorporating a pair of sliding glass panels in a window opening defined by the door, the window opening having an oblique front portion and a vertical rear portion and the rear portion having an elongated aperture therethrough which permits passage of a portion of one of the panels beyond the confines of the door opening when that panel is in an open position thereby to maximize exposed area of the window opening.

2 Claims, 4 Drawing Figures

PATENTED MAR 26 1974  3,799,607
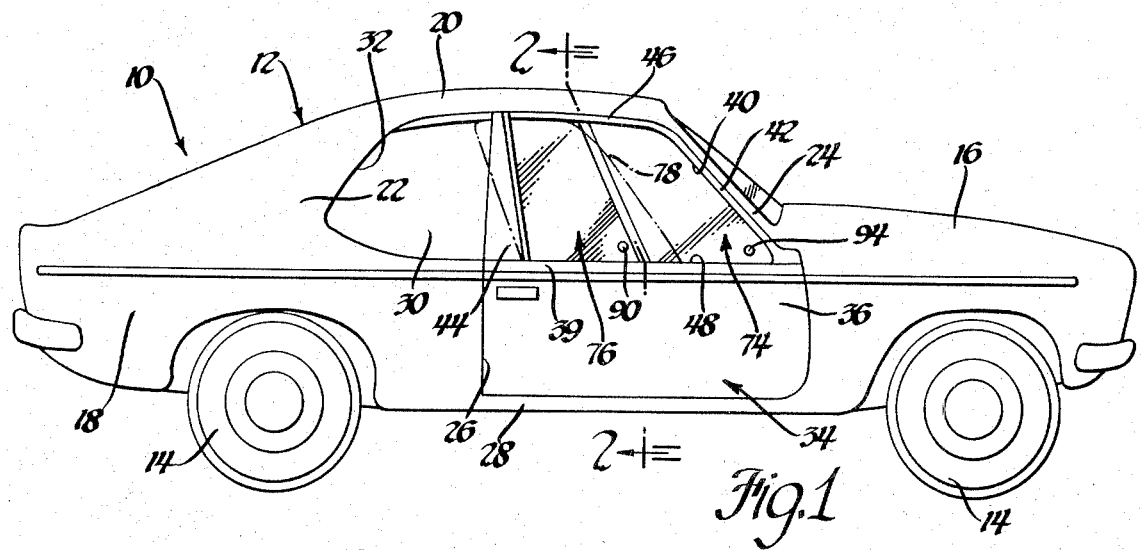
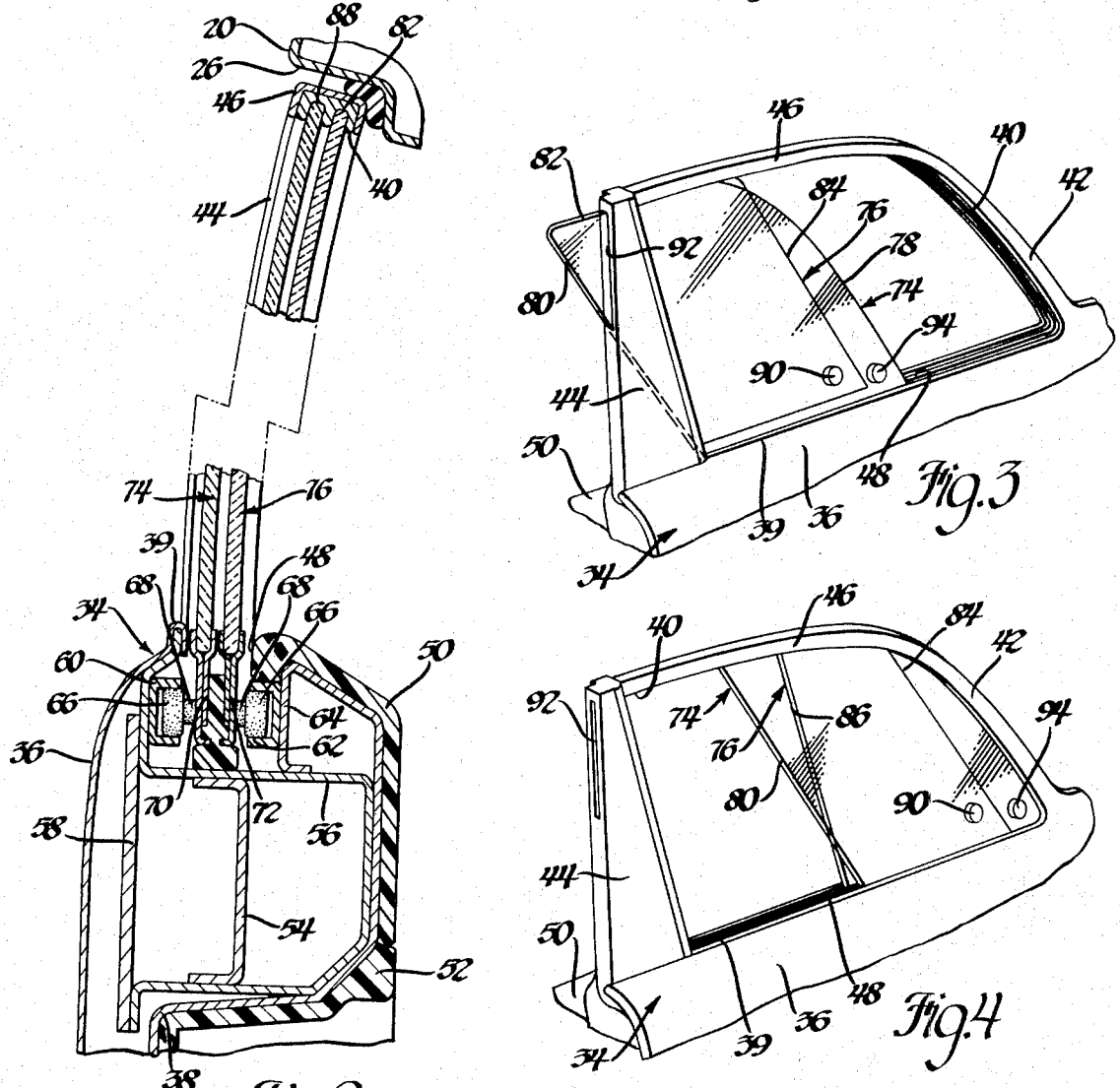

VEHICLE BODY CONSTRUCTION

This invention relates generally to vehicle body constructions and more particularly to an improved window and frame construction for a vehicle door.

One current trend in automobile body design is toward increased window area to maximize driver visibility. Concurrently, however, another trend is toward maintaining or even reducing the overall height of the vehicle. These two trends are somewhat inconsistent with respect to conventional vertically movable door windows because the higher or deeper the window becomes the lower or smaller the well below the window becomes. Accordingly, if the window is deeper than the well below it, a portion of the window will project out of the well or above the lower marginal edge of the window opening even with the window in its fully lowered position. To avoid this situation, designers have been experimenting with fore and aft sliding windows which require no storage well in the door. Here too, however, limitations are presented, one such limitation being the slope or slant of the front portion of the window which engages the front or "A" pillar of the vehicle body. More particularly, since the glass panel must have a sloped front or leading edge to properly mate with the front pillar, sliding that panel rearwardly leaves the sloped edge projecting into the area of the window opening to be exposed. Therefore, available exposed window opening area is reduced. A vehicle body construction according to this invention functions to maximize exposed window opening area in a sliding panel type window installation without hindering the operation of any other component of the vehicle.

The primary feature, then of this invention is that it provides an improved vehicle body construction and in particular an improved vehicle door window construction. Another feature of this invention is that it provides an improved vehicle door window construction of the sliding panel type wherein either one of two panels is bodily shiftable fore and aft between two extreme positions wherein the panels either virtually completely overlap each other thereby to maximize the exposed area of the window opening or are generally contiguous to completely close the window opening. Still another feature of this invention resides in the provision of means for permitting the front sliding panel to project beyond the confines of the window opening and the door in an open position of the panel, thereby to bring the front and rear sliding panels into substantially complete overlapping relationship for maximizing the exposed area of the window opening. A further feature of this invention resides in the provision of a frame portion on the door which defines a path of motion for the front sliding panel and in the provision of an aperture at the rear of the frame for permitting the front panel to project beyond the confines of the opening and the door, the path of motion being disposed outboard of the outermost contour of the vehicle body adjacent the rear marginal edge of the door so that in the open position of the front sliding panel, wherein the latter projects beyond the confines of the door, movement of the door between the open and closed position is unobstructed.

These and other features of this invention will be readily apparent from the following specification and from the drawings wherein:

FIG. 1 is a side elevational view of an automobile type vehicle incorporating a body construction according to this invention;

FIG. 2 is a fragmentary enlarged, sectional view taken generally along the plane indicated by lines 2—2 in FIG. 1;

FIG. 3 is a perspective view of a door window constructed according to this invention and showing the front sliding panel in an open position; and FIG. 4 is similar to FIG. 3 but showing the rear sliding panel in an open position.

Referring now to the drawings, FIG. 1 depicts an automobile type vehicle designated generally 10 including a body portion 12. Typically, the body portion 12 is connected through conventional mountings to a frame or chassis, not shown, on which are rotatably supported a plurality of road wheels 14. Alternatively, of course, the body portion 12 may be of the unitized construction type wherein the frame and body portion are integral and the road wheels are attached directly to the body portion through any conventional suspension arrangement. The body portion 12 includes a front fender and hood assembly 16, a rear quarter panel assembly 18, and a roof structure 20 connected to the rear quarter panel assembly 18 through a sail panel 22. The forward end of the roof structure 20 is supported by a front or "A" pillar 24 disposed between the roof structure and the front fender and hood assembly 16. The vehicle body 12, of course, includes an interior portion, not shown, for accommodating an operator and several passengers, access to the interior being had through a door opening 26 defined, in part, by the rear quarter panel assembly 18, the front fender and hood assembly 16, and a rocker panel 28 extending between the rear quarter panel and the front fender and hood assemblies.

The door opening 26 extends substantially the full height of the body portion 12 with generally the lower half of the opening being defined by the rear quarter panel and the front fender and hood assemblies and the upper half of the opening being defined by the "A" pillar 24, the roof structure 20, and a glass panel 30 disposed in a rear window opening 32 defined by the roof structure 20, the sail panel 22, and the rear quarter panel assembly 18. The door opening 26 is adapted to be selectively closed by a door 34 disposed on the body portion 12 for pivotal or swinging movement about a vertical axis located generally adjacent the forward end of the door opening between an open position, not shown, exposing the door opening and a closed position, FIG. 1, in the door opening.

As seen best in FIG. 2, the door 34 includes an outer panel 36 and an inner panel 38 hem flanged to the outer panel generally around the entire periphery of the latter except at the edges aligned on the belt line 39 of the body portion 12. The door 34 further includes a window opening 40 defined at the front by a front frame portion 42, at the rear by a rear frame portion 44, at the top by an upper frame portion 46, and at the bottom by an elongated aperture 48 between the outer panel 36 and the inner panel 38. As seen best in FIGS. 1, 3 and 4, the "A" pillar 24 extends obliquely with respect to a transverse vertical plane and, accordingly, the front frame portion 42 exhibits a corresponding oblique attitude. The rear frame portion 44 must follow the rear marginal edge of the door opening and is, therefore, oriented in generally vertically to coincide with the front edge of the rear marginal glass panel 30 in the rear window opening. As seen best in FIG. 2, the inner panel 38 is concealed behind a pair of decorative trim panels 50 and 52.

Referring now particularly to FIG. 2, the door 34 has supported between the inner and outer panels thereof a longitudinal beam 54 adapted to maintain passenger compartment integrity in the event of a side impact on the vehicle, the beam being attached to the inner panel 38 by a channel shaped member 56. The member 56 is reinforced by a plate 58 and flanged to the outer panel 36 adjacent the aperture 48. A first cam channel 60 is rigidly attached to the bracket 56 and extends longitudinally of the door 34 below the aperture 48 in a horizontal plane. A similar second cam channel 62 is rigidly attached to an inturned flange portion 64 of the inner panel 38 and disposed in parallel and opposed relation to the first cam channel 60. The cam channels 60 and 62 define a pair of tracks which guidingly receive a plurality of rollers, only two rollers 66 being shown in FIG. 2. Each of the rollers is connected by an axle 68 to a respective one of a pair of carriers 70 and 72, the carriers being disposed below the aperture 48 in a horizontal plane. Each carrier 70 and 72 has a length equal to approximately one-half the length of the aperture 48 and is supported at each end by the rollers for longitudinal bodily shiftable movement in a generally horizontal plane.

As seen best in FIGS. 2, 3 and 4, the carrier 72 rigidly supports the lower marginal edge of a front glass panel 74 and the carrier 70 rigidly supports the lower marginal edge of a rear glass panel 76. The carrier 72 supports the front panel 74 on the door 34 for longitudinal bodily shiftable movement in a path of motion dictated by the cam channel 62 while the carrier 70 similarly supports the rear panel 76 for longitudinal bodily shiftable movement in a parallel path of motion inboard of the path of motion of the front panel 74. The front panel 74 includes a leading edge 78, a trailing edge 80, and a top edge 82 and is adapted to slide fully forward in the window opening 40 to a closed position, FIG. 4, closing the forward portion of the window opening. The front panel 74 defines a skewed parallelogram wherein the top edge 82 is disposed generally horizontally while the trailing edge 82 and leading edge 78 are disposed generally parallel to the front frame portion 42 so that in the closed position of the front panel 74, FIG. 4, the leading edge 78 abuts the front frame portion 42 to effect a seal between the panel and the front frame portion. The rear panel 76 embodies a trapezoidal configuration and includes a front edge 84 generally parallel to the trailing edge 80, a rear edge 86 extending generally vertically in parallel relationship to the rear frame portion 44, and a generally horizontal top edge 88, FIG. 2. The rear panel 76 is bodily shiftable fore and aft in the window opening between a closed position, FIG. 3, wherein the rear edge 86 abuts the rear frame portion 44 to effect sealing engagement on the rear frame portion and an open position, FIG. 4, exposing the rear section of the window opening.

With the front and rear panels 74 and 76 in their respective closed positions, the trailing edge 80 of the front panel slightly overlaps the front edge 84 of the rear panel so that the two panels are generally contiguous and cooperate in completely closing the window opening. The exposed area of the window opening when either of the front or rear panels is moved from the closed position is maximized if that panel can be shifted enough toward the open position to substantially completely overlap the other panel. In the case of a rectangular window opening, exposed area is maximized by constructing each panel to equal one-half the area of the window. In a non-rectangular window opening, however, the situation is more complicated because the two panels do not embody the same configuration and, therefore, will likely not completely overlap when one or the other of the panels is moved to an open position.

As seen best in FIG. 4, when it is desired to expose the rear section of the window opening the rear panel 76 is bodily shifted forwardly, as by a handle 90 thereon, until the front frame portion 42 interfers with the top edge 82 of the panel, FIG. 4. Since the rear panel is in the shape of a trapezoid it assumes a position completely overlapped by the front panel when the rear panel is in the open position and the front panel is in the closed position so that maximum area is exposed at the rear section of the window opening.

As seen best in FIG. 3, when it is desired to expose the front section of the window opening, the skewed parallelogram configuration of the front panel 74 presents a problem in that rearward bodily shiftable movement of the front panel is normally limited by interference engagement between the rear frame portion 44 and the apex defined by the top edge 82 and the trailing edge 80. Where bodily shiftable movement of the front panel is limited thusly, the leading edge 78 would project substantially forwardly of the front edge 84 of the rear panel and would obstruct the exposed forward section of the window opening. A body construction according to this invention functions to maximize the exposed area of the window opening by providing a vertical slot 92, FIG. 4, in the rear frame portion 44, the vertical slot being adapted to receive therethrough a portion of the rear panel 74 when the latter is in the open position. Thus, as the front panel is bodily shifted rearwardly, as by a handle 94, the trailing edge 80 and a portion of the top edge 82 project through the aperture 92 thereby permitting the front panel to assume a position further rearward in the window opening than would otherwise be possible. The length of the aperture 92 is predetermined to permit rearward bodily shiftable movement of the front panel to an open position, FIG. 3, wherein the leading edge 78 is disposed generally adjacent the front edge 84 of the rear panel 76 when the latter is in the closed position. Accordingly, the exposed area at the front section of the window opening is maximized.

In order to insure that the portion of the front panel 74 which projects through the aperture 92 beyond the door 34 and the rear frame portion 44 does not interfere with normal opening and closing movement of the door, the body construction according to this invention provides that the path of motion of the front panel 74 be disposed outboard of the outermost contour of the body portion 12 adjacent the rear marginal edge of the door opening. More particularly, the upper half of the rear marginal edge of the door opening 26 is defined by the glass panel 30. The plane of the glass panel 30 in the closed position of the door 34 is disposed inboard of the path of motion of the front panel 74 on the door. Thus, when the front panel is moved to the open position, the portion thereof projecting behind the rear frame portion 44 overlies the panel 30 so that the door may be moved between the open and closed positions without interference. It will be understood, of course, that a center or "B" pillar between the rear quarter panel assembly 18 and the roof structure 20 may be incorporated in the body portion 12 to define the rear marginal edge of the door opening 26. In this type of construction the outboard or outermost contour of the "B" pillar would be disposed inboard of the path of motion of the front panel 74 so that, again, normal opening and closing of the door 34 is unobstructed even if the front panel is in the open position.

Having thus described the invention, what is claimed is:

1. In a door having a window opening defined by an oblique front frame portion and a substantially vertical rear frame portion and a pair of substantially horizontal upper and lower frame portions, the combination comprising, a first panel disposed in said window opening for fore and aft bodily shiftable movement and defining generally a skewed parallelogram including a leading edge and a trailing edge each generally parallel to said front frame portion, said leading edge engaging said front frame portion in a closed position of said first panel, a second panel disposed in said window opening for fore and aft bodily shiftable movement and including a vertical back edge and a skewed front edge substantially parallel to said trailing edge, said back edge engaging said rear frame portion in a closed position of said second panel wherein the latter cooperates with said first panel in the closed position thereof in closing said window opening, and means on said rear frame portion defining an elongated aperture for permitting bodily movement of a portion of said first panel beyond the confines of said window opening and said door in an open position of said first panel wherein said leading edge is disposed generally adjacent said front edge when said second panel is in the closed position thereby to expose a maximum segment of said window opening in the open position of said first panel.

2. In a vehicle including a body portion having means defining a door opening therein, said means defining said door opening also defining the outermost contour of said body portion adjacent the rear marginal edge of said door opening and along the entire height of the latter, and a door disposed on said body portion for pivotal movement about an axis adjacent the front marginal edge of said door opening between an open position and a closed position in said door opening, the combination comprising, means on said door defining a window opening having a generally vertical rear frame portion and an oblique front frame portion, a first panel having the shape generally of a skewed parallelogram including a leading edge and a trailing edge each substantially parallel to said front frame portion, a second panel having a generally vertical back edge and an oblique front edge substantially parallel to said front frame portion, means supporting said first panel on said door for longitudinal bodily shiftable movement in said window opening in a path of motion disposed outboard of the outermost contour of said body portion adjacent the rear marginal edge of said door opening, said leading edge in a closed position of said first panel engaging said front frame portion, means supporting said second panel on said door inboard of said first panel for bodily shiftable movement, said back edge engaging said rear frame portion in a closed position of said second panel wherein the latter cooperates with said first panel in the closed position thereof in closing said window opening, and means on said rear frame portion defining an elongated aperture disposed in the path of motion of said first panel for permitting bodily movement of a portion of said first panel beyond the confines of said window opening and said door in an open position of said first panel wherein said leading edge is disposed generally adjacent said front edge when said second panel is in the closed position thereby to expose a maximum segment of said window opening in the open position of said first panel.

* * * * *